V. R. RODGERS.
CULTIVATOR ATTACHMENT.
APPLICATION FILED MAY 13, 1919.
1,331,380.
Patented Feb. 17, 1920.
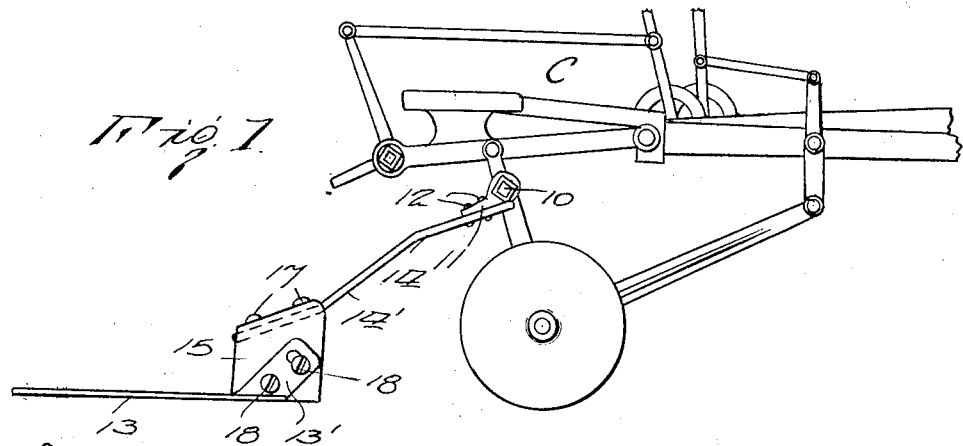
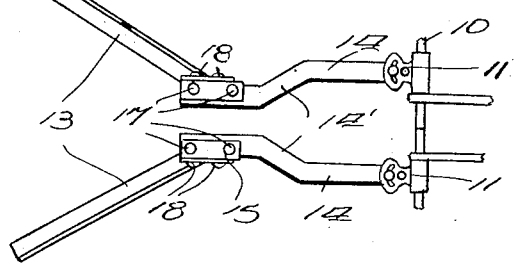
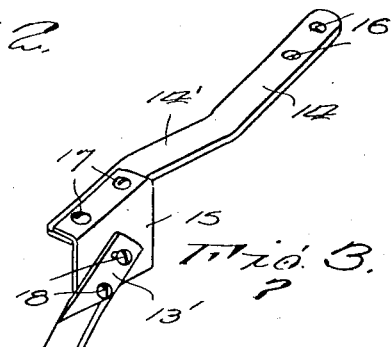
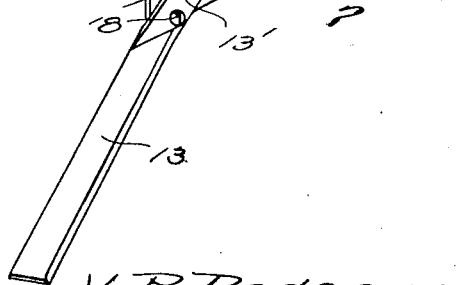
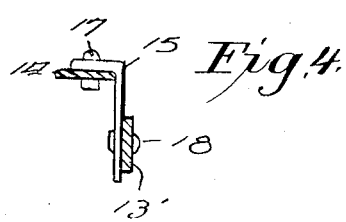
V. R. Rodgers
Inventor
By Geo. P. Kimmel
Attorney

UNITED STATES PATENT OFFICE.

VIRGIL R. RODGERS, OF PLAINVIEW, TEXAS.

CULTIVATOR ATTACHMENT.

1,331,380.
Specification of Letters Patent.
Patented Feb. 17, 1920.

Application filed May 13, 1919. Serial No. 296,819.

*To all whom it may concern:*

Be it known that I, VIRGIL R. RODGERS, a citizen of the United States, residing at Plainview, in the county of Hale and State of Texas, have invented certain new and useful Improvements in Cultivator Attachments, of which the following is a specification.

This invention relates to an improved cultivator attachment for use in connection with a disk cultivator of either the single or double row type and the principal object of the invention is to provide an attachment so constructed that the disk carrying arms may be removed and the attachment substituted in place thereof.

Another object of the invention is to so construct this device that it may be easily and quickly put in place in connection with a conventional construction of cultivator and to further so construct it that when in place it will be securely held and prevented from slipping or otherwise working loose.

Another object of the invention is to so construct this device that the cutting knives may be disconnected from the arms carrying the knives thereby permitting the knives to be sharpened.

This invention is illustrated in the accompanying drawings wherein,

Figure 1 is a view in side elevation showing the attachment connected with the cultivator, Fig. 2 is a top plan view showing the attachment in connection with a fragment of the cultivator, Fig. 3 is a perspective view of one of the attachments, Fig. 4 is a sectional view taken intermediate the length of the attachment shown in Fig. 3.

This attachment is for use in connection with disk cultivators of a conventional construction and therefore a detailed description of the cultivator frame shown in Fig. 1 is not necessary. This cultivator is indicated in general by the letter C and is provided with a shaft 10 at each side mounted in suitable bearings carried by the frame and carrying brackets 11 with which the blade supporting arms will be connected by bolts or other fasteners 12, and these arms carry the knife attachment hereinafter fully described.

Each of the attachments shown in Fig. 2 is constructed as shown in Fig. 3 and therefore a detailed description of one will suffice for all it being understood from an inspection of Fig. 2 that these attachments are supposed to be used in sets of two thus providing a structure in which the cutting blades of each set will extend in diverging relation. From an inspection of Fig. 3 it will be seen that each of the attachments is provided with a cutting blade or knife 13, a carrying arm 14 and a bracket 15 connecting the blade with the bar 14. The forward end portion of each bar 14 is provided with openings 16 to register with the openings in the brackets 11 through which extend the bolts 12. These arms are to extend rearwardly of the cultivator frame and are off-set as shown at 14' thus causing the rear end portions of the arms in each set to be brought closer together than the forward end portions. The brackets 15 are connected with the rear end portions of the bars 14 by bolts or other fasteners 17 and extend downwardly beneath the bars for connection with the upturned forward end portions 13' of the knives 13 through the medium of bolts or other releasable fasteners 18.

When in use the attachments will be supplied in pairs, two being used in connection with a single row cultivator and four not shown being used in connection with a double row cultivator. With this attachment in place the cultivator will be moved along a field and the set of blades will be positioned between the rows. The blades will be positioned to cut weeds either close to the ground or just beneath the ground thereby killing the weeds. When necessary the blades may be removed from the brackets and easily sharpened and then replaced. It will thus be seen that there has been provided an attachment so constructed that it may be easily and quickly put in place and further so constructed that it will be firmly held in place when in use and not liable to get out of the desired position. There has been further provided an attachment which can be easily and quickly disconnected and further so constructed that it may be taken apart and stored in a small amount of space.

What is claimed is:

A cultivator attachment comprising a carrying bar having fastener receiving openings adjacent one end, a bracket positioned to one side of the rear end portion of the bar and extending below the same and having its upper end portion provided with a flange engaging the bar, means releasably connecting the bracket with the bar through the medium of the flange thereof, and a slicing blade extending from the depending brackets and having its forward end portion releasably connected therewith.

In testimony whereof, I affix my signature hereto.

VIRGIL R. RODGERS.